H. S. LOCKWOOD.
SECURING THUMB KNOBS TO ROSES.
APPLICATION FILED MAY 20, 1910.
970,518.
Patented Sept. 20, 1910.
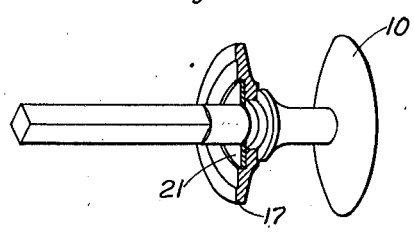
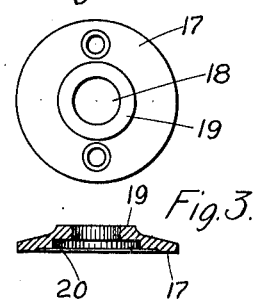
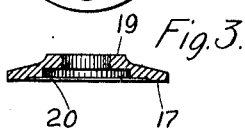
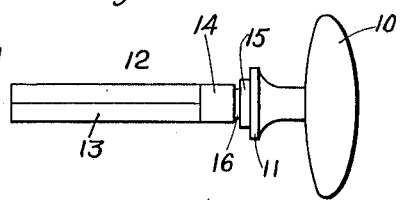
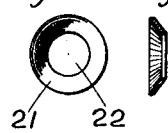 
WITNESSES:
H. W. Meade.
S. W. Atherton.
INVENTOR
Henry S. Lockwood
BY
A. M. Wooster
ATTORNEY

UNITED STATES PATENT OFFICE.

HENRY S. LOCKWOOD, OF SOUTH NORWALK, CONNECTICUT.

SECURING THUMB-KNOBS TO ROSES.

970,518.  Specification of Letters Patent.  Patented Sept. 20, 1910.

Application filed May 20, 1910. Serial No. 562,513.

*To all whom it may concern:*

Be it known that I, HENRY S. LOCKWOOD, a citizen of the United States, residing at South Norwalk, county of Fairfield, State of Connecticut, have invented an Improvement in Securing Thumb-Knobs to Roses, of which the following is a specification.

This invention has for its object to provide a simple, inexpensive and perfectly secure means for attaching thumb knobs to roses or plates which will permit free oscillation of the thumb knob, will not become loose and cannot be detached.

With these and other objects in view I have devised the novel attaching means which I will now describe, referring to the accompanying drawing forming a part of this specification and using reference characters to indicate the several parts.

Figure 1 is a perspective of the knob and shank with the rose and attaching washer in section; Fig. 2 a rear elevation of the rose detached; Fig. 3 a cross section thereof; Fig. 4 a rear elevation of the shank and knob detached; Fig. 5 a side elevation corresponding therewith; Fig. 6 is an elevation of the washer after cupping, and Fig. 7 a section thereof.

10 denotes the knob which is provided with a base 11 which is cast upon or otherwise rigidly secured to a shank 12. The angular portion of the shank is indicated by 13. Said shank is provided with a cylindrical portion 14, having a circumferential groove 16, adjacent which is an enlarged bearing portion 15.

17 denotes a rose or plate which may be of any preferred ornamental design or configuration and which is provided with a central hole 18, in which the bearing portion 15 of the shank turns freely but closely, and surrounding the hole with a bearing 19 with which the base 11 of the knob is in contact. In the back of the rose or plate and concentric with hole 18 is a circular recess 20. The knob and shank are secured to the rose or plate by means of a washer 21 which lies in recess 20 and engages groove 16 in the round portion of the shank. The washer as blanked out is an ordinary circular washer with a central hole 22. The washer is made small enough to lie within recess 20 and the diameter of the hole therein corresponds with the diameter of the shank at the bottom of the circular groove. The washer is then cupped and hole 22 is stretched sufficiently to permit the washer to be passed over around portion 14 of the shank.

In assembling, the shank is passed through the rose or plate from the front, bearing portion 15 of the shank engaging the hole 18 in the rose and the base of the knob contacting with bearing 19, then the washer is passed over the shank and into recess 20 in the rose and into alinement with groove 16 in the shank and then the washer is flattened in the recess, the effect of which is to contract the hole in the washer to substantially its original diameter and force the metal surrounding the hole into the groove in the shank, thereby locking the parts securely together in such a manner that while perfect freedom of oscillation of the bearing portion of the shank in the rose is permitted it will be impossible for the knob and shank to become detached from the rose or to wear loose.

Having thus described my invention I claim:

The combination with a knob shank provided with a cylindrical portion having a circumferential groove and an enlarged bearing portion adjacent said groove, of a rose having an opening to receive said bearing portion, said opening being enlarged adjacent one face of the rose to form a recess, and a washer located in said recess and having an opening for the passage of said shank, the edge of said opening projecting into said groove.

In testimony whereof I affix my signature in presence of two witnesses.

HENRY S. LOCKWOOD.

Witnesses:
  FRANK L. SEYMOUR,
  VICTOR C. SMITH.